United States Patent Office 2,813,002
Patented Nov. 12, 1957

2,813,002

URANIUM PURIFICATION PROCESS

Charles E. Winters, Oak Ridge, Tenn., assignor to the United States of America as represented by the United States Atomic Energy Commission No Drawing. Application December 6, 1949, Serial No. 131,512

5 Claims. (Cl. 23—14.5)

This invention relates to a uranium purification process, and more especially relates to a process for the preparation of a diethyl ether solution of uranyl nitrate.

When uranyl nitrate hexahydrate is prepared from commercially available uranium-containing ores and their concentrates, such as $U_3O_8$ and sodium uranate, the resultant uranyl nitrate hexahydrate is soluble in diethyl ether and the impurities associated therewith are insoluble in the ether. The possibility of purifying uranium by dissolving the impure uranyl nitrate hexadrate in diethyl ether with water washes for removal of the impurities has been recognized. However, the preparation of the ether solution of uranyl nitrate from uranyl nitrate hexadrate has not been developed heretofore for several reasons. Since uranyl nitrate hexahydrate crystallizes into large, hard crystals, and since these crystals dissolve in diethyl ether at a very slow rate, the preparation, even on a small scale, of a diethyl ether solution of uranyl nitrate from uranyl nitrate hexahydrate crystals is quite tedious and time-consuming. This is also true when the crystals are ground to a fine powder before dissolution in ether. Furthermore, in the dissolution stage it is necessary to provide agitation of the ether and this imposes fire and explosion hazards which are obviated only by the use of special equipment. To prepare the crystals of uranyl nitrate hexahydrate in a suitable form for this dissolution, it is necessary to crystallize the hexahydrate from the aqueous solution, separate it from the mother liquor, and dry it, since the aqueous solution from which the crystals are obtained contains other materials dissolved from the original ore or ore concentrate. These preliminary steps of crystallization, etc., require a considerable amount of equipment and labor.

It is an object of this invention to provide a process for the preparation of an ether solution of uranyl nitrate from uranyl nitrate hexahydrate.

It is another object of the present invention to provide a process for dissolving uranyl nitrate hexahydrate in ether without the necessity for preparing uranyl nitrate hexahydrate by crystallization.

Other objects of this invention will be apparent from the description which follows.

I have found that a uranyl nitrate solution in diethyl ether can be prepared by adding molten uranyl nitrate hexahydrate at a temperature of 65 to 105° C. to diethyl ether, while maintaining the ether solution at least several degrees centigrade below its boiling point. The ether is initially below 25° C. and preferably below 20° C. With increasing dissolution of uranyl nitrate the boiling point of the ether solution increases. For example, a uranyl nitrate solution in ether, containing 3.31 lb. of uranium per gallon (i. e., about 50 wt. percent uranyl nitrate) and having a specific gravity at 30° C. of 1.35, has a boiling point of about 50° C. whereas diethyl ether has a boiling point of 34.6° C. During the addition of molten uranyl nitrate hexahydrate, the diethyl ether is continuously cooled, e. g., by continuously passing a portion through a water cooler and returning to the zone where uranyl nitrate hexahydrate is added. This continuous circulation of ether solution provides adequate mixing of ether and uranyl nitrate hexahydrate.

In a batch process molten uranyl nitrate hexahydrate is added until the maximum permissible temperature of the ether solution is reached. The addition is discontinued until circulation of the ether solution through the cooling means lowers the temperature of the solution several degrees and the addition of the molten uranyl nitrate hexahydrate is then resumed. Of course, by control of the addition rate, it is possible to continuously add the uranyl nitrate hexahydrate without the ether solution exceeding the maximum permissible temperature. In a continuous process such addition rate control is necessary and it is easily accomplished by recycling part of the cooled ether solution from a settling zone to the zone where uranyl nitrate hexahydrate and ether are mixed. The temperature of the recycled ether solution is a maximum of about 30° C. and preferably a maximum of 25° C.

The molten uranyl nitrate hexahydrate is obtained by boiling an aqueous solution of uranyl nitrate to remove water until a boiling point of 118° C., which is the boiling point of uranyl nitrate hexahydrate, is reached. The resultant molten liquor is cooled to 65 to 105° C. and the cooled liquor is used as described above.

When the aqueous solution of uranyl nitrate is prepared from a uranium-bearing ore or ore concentrate by nitric acid dissolution and more than the stoichiometric amount of acid is used, the solution is boiled until a boiling point of 118 to 138° C. is reached, and is then steam-sparged at this temperature for substantially complete removal of free nitric acid. The removal of nitric acid and oxides of nitrogen is necessary, since their presence would create a hazard when adding molten uranyl nitrate hexahydrate to diethyl ether. Molten uranyl nitrate hexahydrate, free of nitric acid, has a pH of 2.8 when diluted a hundredfold by distilled water. If the molten liquor is maintained at a temperature of 118 to 138 C. after nitric acid removal, some undesirable precipitation occurs when the pH (hundredfold dilution) rises above 3 due to decomposition. Accordingly, a molten liquor having a pH of 2.7 to 3 (hundredfold dilution) was adopted for plant operation. After acid removal the liquor is cooled to 65 to 105° C. When a temperature above 118° C. is used for acid removal, the amount of water of hydration is less than six moles per mole of uranyl nitrate. In such a case, upon cooling to a temperature below 118° C. water is added to provide the hexahydrate. The resultant uranyl nitrate hexahydrate is cooled to 65 to 105° C. and the cooled liquor is added to diethyl ether as described above.

When the original uranyl nitrate aqueous solution contains impurities originally associated with uranium in its ores and dissolved by nitric acid, the molten liquor prepared therefrom, of course, will contain less than 100% uranyl nitrate hexahydrate.

The amount of uranyl nitrate hexahydrate dissolved by the foregoing process can be varied considerably. For purification of the uranium values by forming such a solution and subsequently water washing the ether solution, it is preferred that the ether solution produced contain at least 20% uranyl nitrate. After the desired amount of uranyl nitrate hexahydrate is added in batch operation, the circulation is stopped and two phases separate. The ether phase contains uranyl nitrate. The second phase contains at least part of the water of hydration and it contains a substantial portion of the impurities originally associated with uranium. After separation of the two phases, the diethyl ether solution of uranyl nitrate is purified, for example, by washing the solution with relatively small amounts of water which will remove the impurities and only relatively small quantities of uranyl nitrate. The total volume of these wash solutions of water is preferably a maximum of 10% of the volume of the ether solution. The uranyl nitrate is suitably recovered from the ether solution by extracting the solution with relatively large amounts of water, e. g., 50% total volume (based on ether volume). The purified uranyl nitrate may then be treated by other processes for the preparation of other uranium compounds and the preparation of the uranium metal.

The following examples will illustrate the process of the present invention on a batch scale and on a continuous scale.

*Example I*

A quantity of commercial $U_3O_8$ was added to a nitric acid solution containing the stoichiometric amount of nitric acid and maintained at a temperature of 90° C. by a steam coil. After the uranium values were dissolved, the resultant solution was pumped through a filter press and the filtered solution was concentrated by boiling until a boiling point of 118° C. at atmospheric pressure was reached. The resultant molten liquor was cooled to about 75° C. by being passed through a water-jacketed cooler. A 115-gal. stainless steel tank was filled with the cooled molten liquor. A 200-gal. quantity of diethyl ether was introduced into a 336-gal. extraction tower having a 30.5-in. diameter. The cone-shaped bottom of the extraction tower was connected by piping, a pump, and a hairpin cooling coil to an inlet means near the top of the extraction tower. The ether in the tower was cooled by circulation through the hairpin cooler containing ice water in its jacket until the ether temperature was below 20° C. The molten liquor was added to the extraction tower at a point near the top of the tower and the ether was continuously circulated through the hairpin cooler. Whenever the temperature rose to 35° C., the addition of molten liquor was stopped, but the ether circulation through the cooler was continued. Whenever the ether solution cooled to about 27° C., the addition of molten liquor was resumed. This process of adding molten liquor in increments with continued circulation of the ether solution through the cooler was continued until the 115 gals. of molten liquor was added. The circulation of the liquids in the extraction tower was then discontinued. After four minutes of settling the lower aqueous layer that was formed was withdrawn from the bottom of the tank. The ether layer contained about 80% of the uranyl nitrate initially present in the molten liquor.

*Example II*

A 5.3-lb. quantity of ore concentrate, $U_3O_8$, was dissolved in 5 lb. of 38°-Baumé nitric acid in a stainless steel pot. The resultant aqueous solution was concentrated to a boiling point of 118° C. (atmospheric pressure). The liquor was cooled to about 80° C. and poured slowly into 9.5 lb. of diethyl ether with cooling of the ether. The mixture was allowed to stand overnight. It was transferred to a stainless steel extractor where the aqueous layer was withdrawn. The ether layer was washed with five 200-ml. quantities of water. The $\beta$-activity, due to the thorium isotope, $UX_1$, was determined for each aqueous wash using a Geiger-Müller counter. The first aqueous wash contained 5,600 $\beta$ counts/min./g. of uranyl nitrate hexahydrate while the fifth wash contained only 25 $\beta$ counts/min. These data indicated that the thorium impurity originally associated with the uranium and dissolved with uranium by the nitric acid was substantially removed by the water washes.

*Example III*

An aqueous solution of uranyl nitrate containing excess nitric acid and impurities normally associated with uranium was prepared. The solution was boiled for removal of water and boiling was continued until the liquor had reached a temperature of about 133° C. At this point, about 75% of the free nitric acid had been removed. The remainder of the free acid was removed by steam sparging or steam distillation. The molten liquor was cooled to a temperature below 118° C. and sufficient water was added to convert hydrated uranyl nitrate in the liquor to uranyl nitrate hexahydrate. The resultant liquor was cooled to 92° C. Several tanks were provided for making several batches of uranyl nitrate hexahydrate liquor at one time from the aqueous solution of uranyl nitrate containing free nitric acid. A continuous supply of molten liquor was thus available for the next operation. Each tank was connected by a manifold system of piping to the top of a mixing column, whereby molten liquor was added at a controlled rate to the top of the column. Ether was also added at a controlled rate to the top of the column by an inlet means connected through a pipe and cooling means to a diethyl ether storage tank. The bottom of the mixing column was connected by pipes, a pump, and a water cooler to an inlet means in the lower part of a separation tower. An outlet means was provided in the upper part of the separation tower. This outlet means was connected by piping to the top of the mixing column for recycling of liquid from the separation tower to the mixing column. An outlet means was also provided at the top of the separation tower for continuous withdrawal of diethyl ether solution. An outlet means was provided at the bottom of the separation tower for continuous withdrawal of the aqueous solution formed.

The ether was added to the mixing column at a rate of 21 gal./hr. and at a temperature of 10° C. The molten liquor, substantially uranyl nitrate hexahydrate, was added to the mixing column at a rate of 11 gal./hr. at a temperature of 92° C. This molten liquor contained 10.32 lb. of uranium/gal. The ether and molten liquor were thoroughly mixed in passing downward through the mixing column. The mixture was pumped through the water cooler, as described above, to the separation tower. In the separation tower an aqueous phase and an ether extract phase were formed. A recycle ether solution was withdrawn continuously from the upper portion of the separation tower at a rate of 33.4 gal./hr. and added to the top of the mixing column. Thus, the mixing column thoroughly mixed the ether, the molten liquor, and the recycle ether solution from the separation tower. The water cooler received this mixture from the mixing column at a temperature of 45.5° C. and cooled the mixture to 25° C. An aqueous solution was withdrawn from the bottom of the separation tower at 3 gal./hr. It contained 5.17 lb. of uranium/gal., while an ether solution containing 3.31 lb. of uranium/gal. was withdrawn from the top of the separation column at a rate of 26.6 gal./hr. Since the mixture of 21 gal./hr. of ether at 10° C. and 11 gal./hr. of molten liquor at 92° C. would produce a mixture having a temperature of 75° C., which is far above the boiling point (about 50° C.) of the resultant ether solution, it was apparent that the recycling of the ether solution from the separation tower served to control the temperature of the mixture to a point below the boiling point of the ether solution.

The ether solution withdrawn from the top of the separation tower was pumped to a point near the bottom of a tall column where it was passed countercurrent to distilled water. The ratio of flow rates of ether solution to water was 10 to 1. The distilled water was added near the top of the column in the form of a fine spray through suitable jets for a high degree of contact between the two phases. The water phase was removed continuously from the bottom of the column. It contained about 25% of the uranyl nitrate originally present in the ether solution and practically all of the impurities originally present in the ether solution. The ether phase was removed continuously from the top of the column. It was piped to the bottom part of a tall extraction column where it was passed countercurrent to distilled water introduced in the top portion of the column. The ratio of flow rates of ether solution to distilled water was about 2 to 1. The aqueous phase withdrawn from the bottom of the extraction column contained about 3.3 lb. uranium/gal. as uranyl nitrate.

The foregoing illustrations of the present invention are not intended to limit its scope, which is to be limited entirely by the appended claims.

What is claimed is:

1. A process for the preparation of a diethyl ether solution of uranyl nitrate, which comprises adding molten uranyl nitrate hexahydrate at a temperature of 65 to 105° C. to diethyl ether, simultaneously cooling the ether to maintain an ether solution at a temperature below its boiling point, and separating an aqueous phase and an ether phase containing uranyl nitrate.

2. A process for the preparation of a diethyl ether solution of uranyl nitrate, which comprises adding to diethyl ether uranyl nitrate hexahydrate at a temperature of 65 to 105° C., said uranyl nitrate hexahydrate being substantially free of nitric acid and containing impurities associated with uranium by nitric acid dissolution of the uranium-containing ore, simultaneously cooling the ether to maintain an ether solution at a temperature below its boiling point, and separating an aqueous phase and an ether phase containing uranyl nitrate.

3. A continuous process for the preparation of a diethyl ether solution of uranyl nitrate, which comprises continuously adding to a mixing zone a molten uranyl nitrate hexahydrate substantially free of nitric acid and at a temperature of 65 to 105° C., cooled diethyl ether, and an ether solution of uranyl nitrate having a maximum temperature of 30° C., said ether solution being obtained in a step hereinafter described, continuously removing the resultant mixture from the mixing zone, cooling the mixture to a maximum temperature of 30° C., continuously transferring the cooled mixture to a settling zone for separation of an aqueous phase and an ether solution phase, continuously withdrawing a portion of the ether solution from the settling zone and transferring said ether solution to the mixing zone, and continuously withdrawing the aqueous phase and a second quantity of the ether solution of uranyl nitrate from the settling zone.

4. A process for the preparation of a diethyl ether solution of uranyl nitrate, which comprises boiling an aqueous solution containing uranyl nitrate to remove water until a boiling point of about 118° C. is obtained, cooling the resultant liquor to a temperature between 65 and 105° C., adding the cooled molten liquor to diethyl ether, simultaneously cooling diethyl ether during the molten liquor addition to maintain the ether solution at a temperature below its boiling point, settling the resultant mixture, and separating an aqueous phase and an ether phase containing uranyl nitrate.

5. A process for the preparation of a diethyl ether solution of uranyl nitrate, which comprises boiling an aqueous solution containing uranyl nitrate and nitric acid until the boiling point of the solution reaches 118 to 138° C., passing steam through the molten liquor until free nitric acid has been substantially removed, cooling the molten liquor to a temperature below 118° C., securing uranyl nitrate in the hexahydrate form, cooling the molten liquor to a temperature between 65 and 105° C., and adding the cooled molten liquor to diethyl ether with simultaneous cooling of said ether.

No references cited.